United States Patent
Fu et al.

(10) Patent No.: US 10,484,750 B2
(45) Date of Patent: Nov. 19, 2019

(54) METHODS, RADIO COMMUNICATION DEVICE AND BASE STATION DEVICE FOR MANAGING A MEDIA STREAM

(71) Applicant: Telefonaktiebolaget LM Ericsson (publ), Stockholm (SE)

(72) Inventors: Jing Fu, Solna (SE); Steven Corroy, Järfälla (SE); Rickard Cöster, Hägersten (SE); Mathias Sintorn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/575,556

(22) PCT Filed: Jun. 3, 2015

(86) PCT No.: PCT/SE2015/050645
§ 371 (c)(1),
(2) Date: Nov. 20, 2017

(87) PCT Pub. No.: WO2016/080884
PCT Pub. Date: May 26, 2016

(65) Prior Publication Data
US 2018/0132010 A1    May 10, 2018

(51) Int. Cl.
*H04L 29/06* (2006.01)
*H04N 21/6373* (2011.01)
(Continued)

(52) U.S. Cl.
CPC ..... *H04N 21/6373* (2013.01); *H04L 12/4625* (2013.01); *H04L 29/06* (2013.01);
(Continued)

(58) Field of Classification Search
None
See application file for complete search history.

(56) References Cited

U.S. PATENT DOCUMENTS

2003/0018796 A1* 1/2003 Chou ............... H04L 29/06
709/231
2003/0053482 A1* 3/2003 Li .................... H04L 1/0002
370/465
(Continued)

FOREIGN PATENT DOCUMENTS

CN    102811367 A    12/2012
EP    2530997 A1    12/2012
(Continued)

OTHER PUBLICATIONS

Extended European Search Report, EP 15861140.0 dated Apr. 20, 2018, 10 pages.
(Continued)

*Primary Examiner* — Ajay Cattungal
*Assistant Examiner* — Gautam Sharma
(74) *Attorney, Agent, or Firm* — Sage Patent Group

(57) ABSTRACT

Methods for managing a media stream from a media server are disclosed. The communication device transmits, to the media server, a request for the first set of media rates and the at least one segment time period. The communication device receives a response indicating the first set of media rates and the at least one segment time period. Moreover, the communication device transmits, to the base station, a request for a second set of media rates, wherein the request comprises information about the first set, a parameter relating to length of the at least one segment time period, and an indication relating to a time period during which the second set of media rates is below a media stream rate for reception at the communication device. Furthermore, the communication device receives a response indicating the second set, and selects a media rate out of the second set.

18 Claims, 6 Drawing Sheets

(51) Int. Cl.
  H04N 21/2343    (2011.01)
  H04N 21/647     (2011.01)
  H04N 21/845     (2011.01)
  H04L 12/46      (2006.01)
  H04W 4/18       (2009.01)
  H04W 88/08      (2009.01)

(52) U.S. Cl.
  CPC ...... *H04L 65/4084* (2013.01); *H04L 65/4092* (2013.01); *H04L 65/607* (2013.01); *H04N 21/23439* (2013.01); *H04N 21/647* (2013.01); *H04N 21/8456* (2013.01); *H04L 69/24* (2013.01); *H04W 4/18* (2013.01); *H04W 88/08* (2013.01)

(56) References Cited

U.S. PATENT DOCUMENTS

| | | | |
|---|---|---|---|
| 2006/0067362 A1* | 3/2006 | Ramakrishnan | H04N 21/235 370/468 |
| 2006/0156365 A1* | 7/2006 | Zhang | H04N 21/238 725/117 |
| 2009/0307367 A1* | 12/2009 | Gigliotti | G06F 15/16 709/231 |
| 2010/0061480 A1* | 3/2010 | Kashiwase | H04W 52/04 375/295 |
| 2010/0271947 A1* | 10/2010 | Abdelal | H04L 47/263 370/235 |
| 2011/0029664 A1* | 2/2011 | Harrang | H04L 1/0002 709/224 |
| 2012/0307886 A1 | 12/2012 | Agarwal et al. | |
| 2013/0016791 A1* | 1/2013 | Collard | H04L 65/607 375/240.25 |
| 2013/0138830 A1* | 5/2013 | Fang | H04L 47/263 709/233 |
| 2013/0332623 A1* | 12/2013 | Gahm | H04L 65/4092 709/234 |
| 2014/0029455 A1 | 1/2014 | Kumar et al. | |
| 2014/0047071 A1 | 2/2014 | Shehada et al. | |
| 2014/0126502 A1* | 5/2014 | Westberg | H04W 72/1247 370/329 |
| 2014/0219230 A1 | 8/2014 | Thomas et al. | |
| 2014/0334309 A1* | 11/2014 | Mihaly | H04L 47/2441 370/235 |
| 2015/0230002 A1* | 8/2015 | Brockmann | H04N 21/2335 725/126 |
| 2015/0295976 A1 | 10/2015 | Lee et al. | |
| 2016/0182594 A1* | 6/2016 | White | H04L 65/607 709/219 |

FOREIGN PATENT DOCUMENTS

| | | |
|---|---|---|
| EP | 2696552 A1 | 2/2014 |
| WO | WO 2014/069905 A1 | 5/2014 |
| WO | WO 2014/206116 A1 | 12/2014 |

OTHER PUBLICATIONS

International Search Report and Written Opinion of the International Searching Authority, International Application No. PCT/SE2015/050645, dated Feb. 2, 2016, 11 pages.

* cited by examiner

METHODS, RADIO COMMUNICATION DEVICE AND BASE STATION DEVICE FOR MANAGING A MEDIA STREAM

CROSS REFERENCE TO RELATED APPLICATIONS

This application is a 35 U.S.C. § 371 national stage application of PCT International Application No. PCT/SE2015/050645 filed on Jun. 3, 2015, the disclosure and content of which is incorporated by reference herein in its entirety.

TECHNICAL FIELD

Embodiments herein relate to video coding technologies, such as adaptive bitrate streaming technologies. In particular, a method and a radio communication device for managing a media stream to be received from a media server as well as a method and a base station device for managing a media stream to be transmitted from a media server to a radio communication device are disclosed. A corresponding computer program and a carrier therefor are also disclosed.

BACKGROUND

A particular area within video coding relates to concerns how to manage streaming of videos, or video files, from a server unit to a client device. The server unit may be hosted by a content provider, which offers videos for streaming to client devices, either for free or at a charge. The videos may be provided from a real time source or from a storage device, such as a disc drive or the like.

In this context, bitrate of the video is relevant for the experience of a user receiving a video at a client device. If the bitrate is high, the experience may be good under the condition that a connection between the client device and the server unit is capable of feeding the stream to the client device without interruptions etc. This means that a throughput of the connection is sufficiently high. Expressed differently, a bandwidth of the connection is sufficiently high. On the other hand, the experience may be good even if the bitrate is low. For example, the experience may be rated good for a lower bitrate, in cases where a stream at a higher bitrate would be exposed to interruptions, since the interruptions may typically worsen the experience for the user.

In order to adapt the bitrate to a currently available throughput in a computer/telecom network, so called Adaptive Bit Rate (ABR) video can be used. Hence, the currently available throughput for a particular user is measured and then the bitrate of the video, to be streamed to the particular user, is adjusted accordingly. An adjustment of the bitrate to a higher bitrate leads to that higher throughput is required, and an adjustment of the bitrate to a lower bitrate leads to that a lower throughput would be sufficient.

An example of ABR is Moving Pictures Expert Group (MPEG)—Dynamic Adaptive Streaming over HTTP (DASH), where HTTP is short for HyperText Transfer Protocol. In e.g DASH, the video is stored in the server unit in different segments of a certain media length, e.g. a length in seconds, minutes etc. For each segment a number of different video files, corresponding to different media rates are available at the server unit. At initial request of a video from the client device, the server unit first responds with a manifest file telling the client device what is the used segment length for this video and which different media rates that are available.

Usually, the client device request the first segment at the lowest available media rate as the client device do not have any understanding of the available throughput before any transmission has occurred. During reception of the first segment, the client device can start to estimate the available throughput, e.g. through measuring the time it took to download that first segment. Based on the estimated throughput, the client device will then for consecutive segments request segments with media rate slightly below the estimated throughput, in order to try to avoid buffer under-run, i.e. in the client device's buffer for video to be output at e.g. a screen or the like. Buffer under-run occurs when the client device empties its buffer for video to be output, i.e. the buffer is emptied faster than it is filled. This can e.g. happen when the throughput of the above mentioned connection is not sufficiently high.

Estimations of available throughput for a client device exhibit some limitations.

First, the estimation can only be based on periods for which video files are actually transmitted to the client device. This makes it hard to correctly estimate fast changes in available throughput, e.g. due to fast changes in radio environment in a wireless network.

Secondly, the client device only has the understanding of the currently available throughput for itself. In a wireless network, the available throughput over a radio link is shared among a plurality of client devices. This can lead to oscillations between several bitrates for video when the plurality of client devices attempt to adjust bitrate of received video streams.

To overcome these limitations, it has been proposed that a network node recommends a bitrate in order to guide in adaption of the bitrate, such as guide in adapting to the currently available throughput as mentioned above. The network node is aware of network factors, such as overall resource and user situation. Thus, the network node can consider these network factors when finding the recommended bitrate.

The available throughput for a user equipment (UE) in a mobile network, such as a Long Term Evolution (LTE) network, changes over time due to various reasons.

Firstly, the UE may move around and may have better or worse radio quality depending on the distance to a serving cell of the LTE network.

Secondly, even if the UE is stationary, the radio quality can change over time as objects, e.g. cars, buses, other user equipments, in the environment move.

Thirdly, a number of active user equipments in the serving cell may change and result in changes of an available throughput.

Finally, the UE may be handed over to another cell, with different number of active user equipments, and different radio qualities (conditions). This also results in change of available throughput.

The aforementioned ABR manages selection of bitrate by detecting a UE's available throughput, or throughput, in real time. Then, the ABR caters for adjustment of quality of a video stream, received by the UE, while taking the available throughput into account. In more detail, the bitrate of the video stream is adjusted. However, in case of the mobile network above, the UE's available throughput changes faster and more frequent than in wired computer networks, i.e. computer networks that does not provide wireless connections and mobility of client devices. Thus, ABR may need to update the bitrate of the video stream frequently, which results in poor experience for the user. The experience for the user is poor because resolution of the video, e.g. in terms of pixel and/or bitdepth of color component for the pixels, changes often due the frequent changes of the bitrate. A problem is hence that a so called Quality of Experience (QoE) is low.

Abstract of CN102811367 discloses adaptive video encoding based on predicted wireless channel conditions. Based on at least one of a number of transmitter side indications of the available throughput of a wireless channel for video delivery, an encoder rate adaptation mechanism generates an estimate of the supportable throughput of the wireless channel under different operating conditions. An encoding parameter, such as encoder bitrate, is subsequently altered based on the estimated throughput value. In one instance, transmitter side throughput indicia is used to generate target encoder bitrates for multiple potential data rates/channel and/or modulation and coding scheme selections that may be used in video delivery. In anticipation of or immediately following a transition to one such data rate and/or modulation and coding scheme selection, the encoder bitrate is altered in accordance with an associated target bitrate. In another mode, average transmit queue latency information is used to further regulate the encoder bitrate. In some scenarios, the encoder bitrate does still not provide a sufficiently good QoE for a user receiving the video delivery. Specifically, frequent changes of bitrate of the video may be a problem.

SUMMARY

An object may be to improve QoE for a user receiving a media stream, such as a video stream, in connection with adaptive bitrate streaming and the like.

According to an aspect, the object is achieved by a method, performed by a radio communication device, for managing a media stream to be received from a media server. The media stream comprises a plurality of segments, which are defined by a first set of media rates and by at least one segment time period relating to a duration of the plurality of segments. The radio communication device transmits, to the media server, a request for the first set of media rates and the at least one segment time period. Next, the radio communication device receives, from the media server, a response indicating the first set of media rates and the at least one segment time period.

Moreover, the radio communication device transmits, to a base station device, a request for a second set of media rates. The request comprises information about the first set of media rates, a parameter relating to length of the at least one segment time period, and an indication relating to a time period during which the second set of media rates is below a media stream rate for reception at the radio communication device. In this manner, the base station device is able to predict the media stream rate, based on the indication and the parameter, and to assign one or more of the first set of media rates to the second set of media rates based on the media stream rate.

Furthermore, the radio communication device receives, from the base station device, a response indicating the second set of media rates. The radio communication device selects a media rate out of the second set of media rates.

According to another aspect, the object is achieved by a method, performed by a base station device, for managing a media stream to be transmitted from a media server to a radio communication device. The media stream comprises a plurality of segments, which are defined by a first set of media rates and by one or more segment time periods relating to a duration of the plurality of segments. The base station device receives, from the radio communication device, a request for a second set of media rates. The request comprises information about the first set of media rates, a parameter relating to length of the one or more segment time periods, and an indication relating to a time period during which the second set of media rates is below a media stream rate for reception at the radio communication device. Next, the base station device selects a model for prediction of the media stream rate based on the indication and the parameter. Moreover, the base station device obtains information about radio conditions for use as input to the model.

Furthermore, the base station device predicts the media stream rate based on the selected model and the information about radio conditions. Next, the base station device assigns one or more of the first set of media rates to the second set of media rates based on the predicted media stream rate. Subsequently, the base station device transmits, to the radio communication device, a response indicating the second set of media rates.

According to a further aspect, the object is achieved by a radio communication device configured for managing a media stream to be received from a media server, wherein the media stream comprises a plurality of segments, which are defined by a first set of media rates and by at least one segment time period relating to a duration of the plurality of segments. The radio communication device is configured for transmitting, to the media server, a request for the first set of media rates and the at least one segment time period. The radio communication device is configured for receiving, from the media server, a response indicating the first set of media rates and the at least one segment time period.

Moreover, the radio communication device is configured for transmitting, to a base station device, a request for a second set of media rates. The request comprises information about the first set of media rates, a parameter relating to length of the at least one segment time period, and an indication relating to a time period during which the second set of media rates is below a media stream rate for reception at the radio communication device. In this manner, the base station device is able to predict the media stream rate, based on the indication and the parameter, and to assign one or more of the first set of media rates to the second set of media rates based on the media stream rate.

Furthermore, the radio communication device is configured for receiving, from the base station device, a response indicating the second set of media rates. Additionally, the radio communication device is configured for selecting a media rate out of the second set of media rates.

According to yet another aspect, the object is achieved by a base station device configured for managing a media stream to be transmitted from a media server to a radio communication device, wherein the media stream comprises a plurality of segments, which are defined by a first set of media rates and by one or more segment time periods relating to a duration of the plurality of segments.

The base station device is configured for receiving, from the radio communication device, a request for a second set of media rates. The request comprises information about the first set of media rates, a parameter relating to length of the one or more segment time periods, and an indication relating to a time period during which the second set of media rates is below a media stream rate for reception at the radio communication device. The base station device is configured for selecting a model for prediction of the media stream rate based on the indication and the parameter.

Moreover, the base station device is configured for obtaining information about radio conditions for use as input to the model. The base station device is configured for predicting the media stream rate based on the selected model and the information about radio conditions.

Furthermore, the base station device is configured for assigning one or more of the first set of media rates to the second set of media rates based on the predicted media stream rate.

Additionally, the base station device is configured for transmitting, to the radio communication device, a response indicating the second set of media rates.

According to further aspects, the object is achieved by computer programs and carriers therefor corresponding to the aspects above.

Thanks to that the radio communication device receives the response indicating the second set of media rates, the radio communication device is assisted by the base station device in selecting the media rate, which e.g. is considered appropriate from a point of view of the base station device, i.e. the network. Hence, when the radio communication device selects the media rate out of the second set of media rates, it can be ensured, at least to some extent, that the media stream with the selected media rate can be successfully transferred from the media server, via the base station device, to the radio communication device. In this context, successful transfer refers to that the media stream is transferred at one and the same media rate during the time period indicated by the indication. Accordingly, frequent media rate changes are avoided. Therefore, it is expected that QoE for a user receiving the media stream is increased. In some examples, the time period may be 10 s, 1 min, 5 min, etc, depending on preference of the user and/or a content provider managing the media server.

An advantage is that the radio communication device may select the media rate out of the second set of media rates. Thus, the radio communication device may, at least to some extent, ensure that the QoE is improved due to less frequent changes of the media rate.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
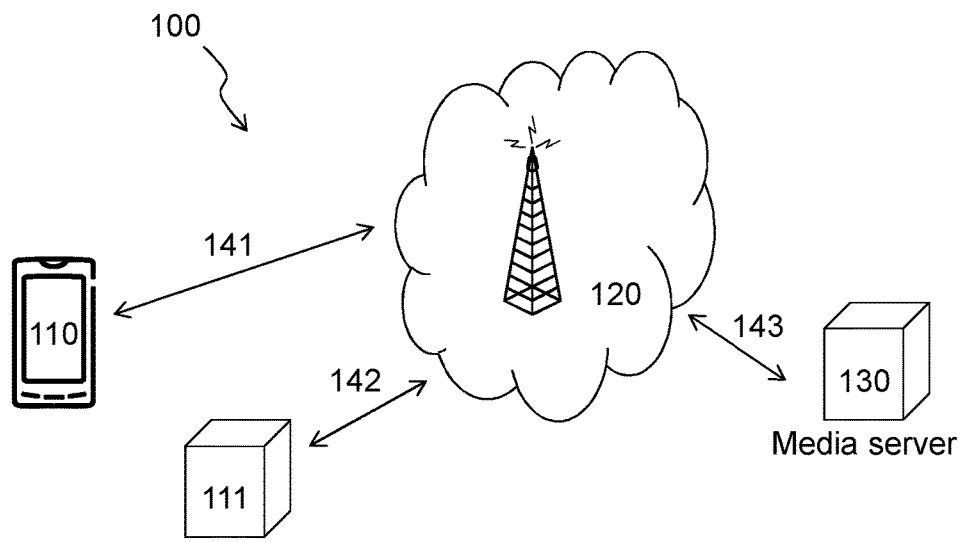
FIG. 1 is a schematic overview of an exemplifying system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying system 100, such as a computer system, communication system or the like, in which embodiments herein may be implemented.

The system 100 comprises a radio communication device 110, such as a mobile phone or the like as listed below. Additionally, the radio communication device 110 may be a client application 111 from a content provider.

The system 100 further comprises a radio communication network, which is represented by a base station device 120. The radio communication network may be based on Global System for Mobilecommunication (GSM), Long Term Evolution (LTE), Universal Mobile Telecommunication System (UMTS), Worldwide Interoperability for Microwave Access (WiMAX), WiFi or the like.

The base station device 120 may be a NodeB, eNB, Radio Network Controller (RNC), a radio base station, a Radio Remote Unit (RRU), a relay, a repeater, Base Station System (BSS) or the like.

Moreover, the system 100 comprises a media server 130. The media server may store a number of media streams, such as video streams and/or audio streams. The media streams are partitioned into segments, where the segments may have different quality. The different qualities may e.g. be represented by that the segments are encoded with different bitrates. Factors that affect the bitrate are e.g. resolution of images in a video stream, frame rate of video stream, bitdepth of components representing sounds/images etc. The content provider, mentioned above, may also provide the media server 130.

Continuing the discussion about the segments, each media stream comprises a plurality of segments. The segments are defined by a first set of media rates and by at least one segment time period relating to a duration of the plurality of segments. As an example, the segments may be encoded with different media rates, i.e. with different bitrates, such as 200 kbit/s, 500 kbit/s, 1 Mbit/s, etc. The duration of the plurality of segments may be the same for all of the plurality of segments. Alternatively, the duration may be different for some or all of the plurality of segments. The duration refers to length, e.g. in seconds, minutes, etc., of the segment when played back, e.g. output to a screen and/or a speaker and/or the like. The term "segment time period" thus refers to the length, in terms of time, of the segment.

The radio communication device 110 may communicate 141 with the base station device 120. Similarly, the content provider 11 may communicate 142 with the base station device 120. Additionally, the base station device 120 may communicate 143 with the media server 130 in order to stream media from the media server 130 to the radio communication device 110 and/or the content provider 111. In the above examples, the communication is performed via the radio communication network.

As used herein, the term "radio communication device" may refer to a user equipment, a wireless device, a content provider, a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 2:
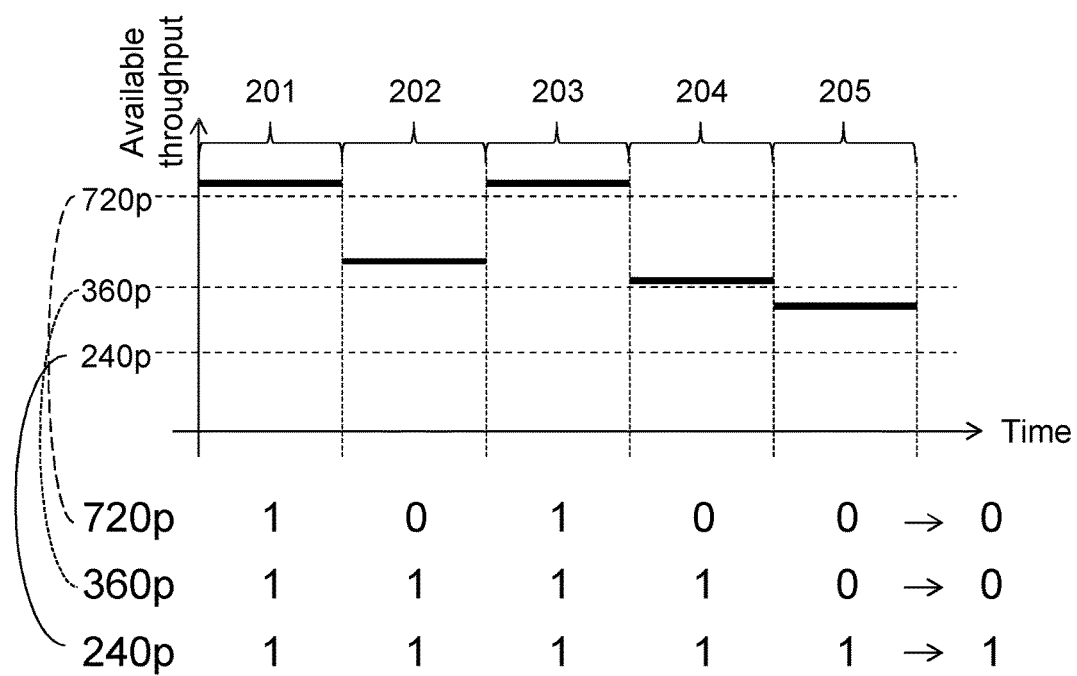
FIG. 2 is a diagram illustrating average bitrate as a function of time.

In order to facilitate understanding of the description of the embodiments herein, FIG. 2 is provided. FIG. 2 illustrates varying radio conditions as a function of time. The time domain is split into a number of segment time periods 201, 202, 203, 204 and 205. The bold horizontal lines illustrate average available throughput for e.g. the radio communication system represented by the base station device 120. The average available throughput is thus taken as an example of the radio conditions.

In the diagram of FIG. 2, bitrates of the plurality of segments are represented as 240p, 360p and 720p. "p" represents lines of vertical resolution for one picture. As is commonly understood a bitrate of a video is dependent on the resolution in which it is encoded when the same encoding is used.

As shown in the table below the diagram, for each segment time period 201, 202, 203, 204, 205 it is indicated by 1 or 0 whether or not the bitrates required for the different resolutions, indicated to the left of the diagram, are below the currently available throughput. In this example, the network, i.e. the base station device 120, would indicate that 240p would be suitable in case a time period, over which the same bitrate is required, spans over all segment time periods 201, 202, 203, 204 and 205. For another example, in which the time period spans over only segment time periods 201, 202, 203 and 204, the base station device 120 would indicate that both 240p and 360p would be suitable, since currently available through for each of these segments is above throughput required for 360p, and of course throughput required for 240p as well.

In addition, in some examples, a number of potential bitrates is high, i.e. there are many encodings of the segments stored at the media server 130. Then, a binary search to test some of the number of potential bitrates may be enough to reduce number bitrates that needs to be evaluated, e.g. in terms of its relation to predicted throughput. For example, if potential rates are 1, 2, 3 . . . 10 Mbit/s, then 5 Mbit/s may be evaluated first. If the answer is YES, then there is no need to evaluate 1-4 Mbit/s. If the answer is NO, then there is no need to evaluate 6-10 Mbit/s.

As used herein, the term "media rate" may refer to bitrate of the plurality of segments.

As used herein, the term "media stream rate" may refer to an available throughput predicted by the base station device 120.

Figure 3:
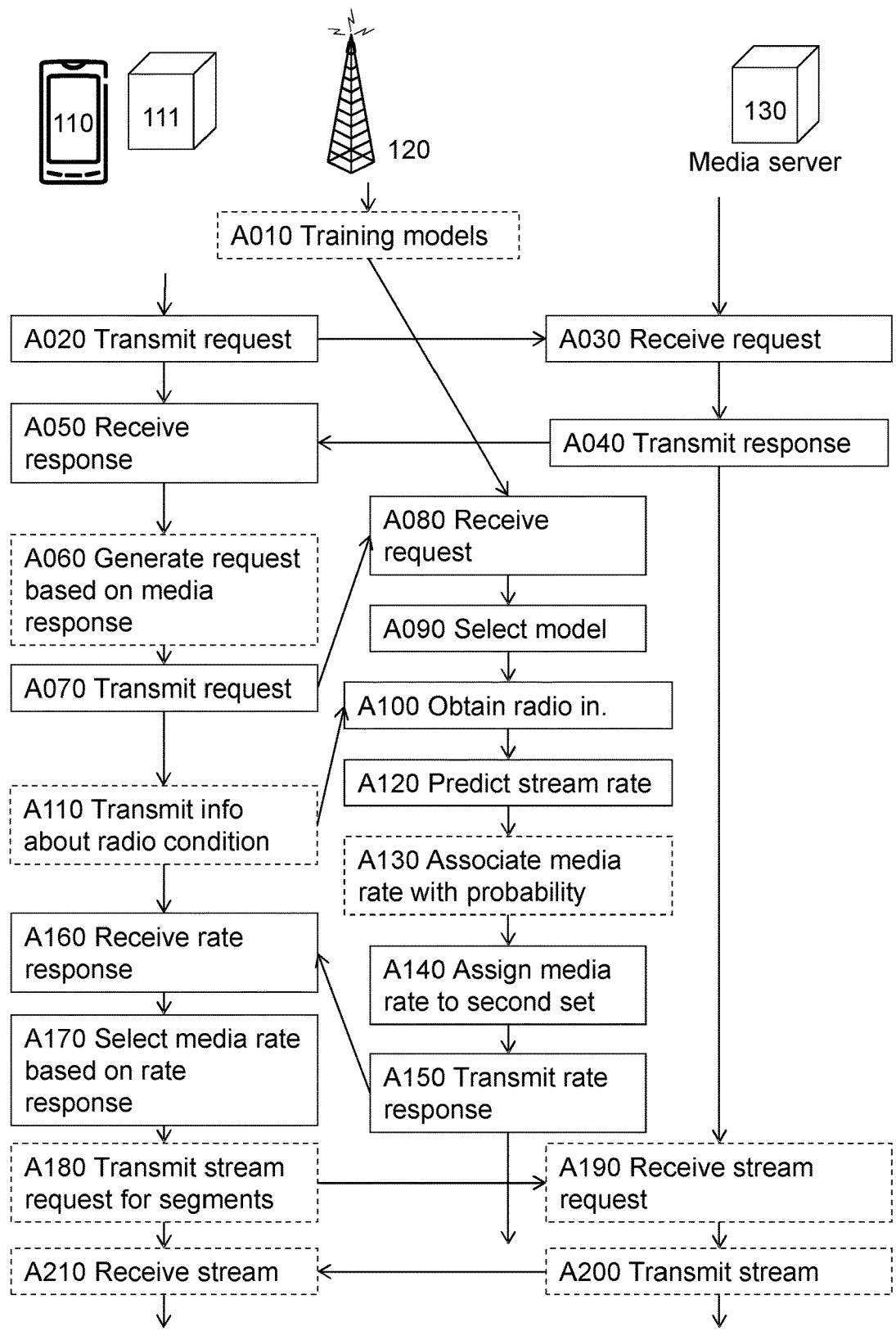
FIG. 3 is a combined signaling and flowchart illustrating the methods herein.

FIG. 3 illustrates an exemplifying method according to embodiments herein when implemented in the system 100 of FIG. 1.

The radio communication device 110 performs a method for managing a media stream, such as a video stream, audio stream, a combination thereof or the like, to be received from the media server 130. The base station device 120 performs a method for managing the media stream, which is to be transmitted from the media server 130 to the radio communication device 110.

One or more of the following actions may be performed in any suitable order.

Action A010

In order to prepare a set of models for use in e.g. action A120, the base station device 120 may train the set of models. The set of models may include any known prediction models based on e.g. neural networks, logistic regression, random forest, Support Vector Machine (SVM) etc. The set of models may comprise a model for prediction of the stream rate, i.e. a particular model that is referred to as "the model" in e.g. action A090.

Training of the set of models includes feeding the set of models with requisite input data as well as a desired ground truth, i.e. a value that is desired as output when feeding the model with the requisite input data.

In order to perform assignment of bitrates in action A140, pre-learned models may be constructed, and stored in a model database inside the radio communication network. The model database may comprise the set of models, where there are models for different bitrates, time periods, and segment time period—given by "a parameter" mentioned in action A060—and combinations thereof. The models may as mentioned be trained using different machine learning classifiers, including decision trees, logistic regression, neural networks, support vector machines, and deep learning. The models can be learned using either classification or ordinal regression.

When creating the model, the statistics used as input to the model may of course be used in combination with a known desired output. For example, throughput values for the radio communication device together with time periods and segment time periods are used.

In case the models are updated online, a mechanism is added to automatically ensure that a training dataset is balanced, meaning that a similar amount of examples for each bitrate is input to a learning algorithm. In this manner, accuracy of the predictions obtained by the pre-learned models may be improved. The mechanism collects current online data and either waits until enough data for each bitrate is available to build the model, or uses past historical data combined with more recent data in order to build the model, or a combination thereof. When the models are created offline, this is taken into account elsewhere.

Action A020

At this stage, a user of the radio communication device 110 may wish to watch and/or listen to one of the media stream that the media server 130 is able to provide. Thus, the radio communication device 110 transmits, to the media server 130, a request for the first set of media rates and the at least one segment time period.

In this manner, the radio communication device 110 asks the media server 130 about available media rates for the segments and length of the segments.

Action A030

The media server 130 receives the request upon which it reacts by fetching duration of segments and media rates, i.e. bitrates of segments, e.g. from a memory of the media server 130.

Action A040

Now that the requested information is fetched, the media server 130 transmits a response indicating the first set of media rates and the at least one segment time period. The response may include a so called manifest file. The manifest file may have the following format:

| Rate 1 | Rate 2 | Rate 3 |
|--------|--------|--------|
| 240 p  | 360 p  | 480 p  |

The manifest file may contain K possible rates and a video time t_vid that represents a length of the media stream. Also, it contains segment time period(s), which specifies length of segments. As an example, in case of live streaming t_vid may be set to t_max, since there is no foreseeable end of the streaming.

Action A050

In response the request in action A020, the radio communication device 110 receives, from the media server 130, the response sent in the preceding action. Thanks to the response, the radio communication device 110 is made aware of the first set of media rates and the at least one segment time period, i.e. media rates that are available for streaming from the media server 130 and length of those segments.

Action A060

The radio communication device 110 generates a request for a second set of media rates. The request comprises:
information about the first set of media rates,
a parameter relating to length of the at least one segment time period, and
an indication relating to a time period during which the second set of media rates is below the media stream rate for reception at the radio communication device 110.

This means that the request indicates the first set of media rates, the length of the at least one segment time period, and the time period during which the second set of media rates is below the media stream rate for reception at the radio communication device 110.

The information about the first set of media rates may indicate the above mentioned K possible rates.

The media stream rate—the rate of the media stream or bitrate of the media stream—relates to bitrate at which the radio communication device 110 receives, or is predicted to be capable of receiving, the media stream. Accordingly, the media stream rate may reflect an available throughput, predicted by the base station device 120, for each segment that at least partly is comprised in the time period indicated by the indication.

By means of the request, the radio communication device 110 seeks assistance from the base station device 120 in identifying the second set of media rates. The second set of media rates may thus be those media rates for which the base station device 120 predicts that available throughput will be sufficient during each of the segments that forms the time period indicated by the indication. See also action A120 below.

Action A070

E.g. upon completion of the generation of the request, the radio communication device 110 transmits, to the base station device 120, the request for the second set of media rates.

In this manner, the radio communication device 110 enables the base station device 120 to predict the media stream rate, based on the indication and the parameter, and to assign one or more of the first set of media rates to the second set of media rates based on the media stream rate, as detailed below in e.g. action A120.

It shall be understood that the indication relates the time period during which the second set of media rates is predicted, by the base station device 120, to be received at the radio communication device 110 without buffer under-run at the radio communication device 110.

The request may be called possibleRatesRequest message. This message contains the possible rates 1, . . . , K from the media server 130, the time period indicated by the indication and optionally user preferences. The user preference may indicate a media rate that the user prefers.

Action A080

The base station device 120 receives, from the radio communication device 110, a request for a second set of media rates, wherein the request comprises:
information about the first set of media rates,
a parameter relating to length of the one or more segment time periods, and
an indication relating to a time period during which the second set of media rates is below a media stream rate for reception at the radio communication device 110.

Action A090

The base station device 120 selects a model for prediction of the media stream rate based on the indication and the parameter.

Action A100

The base station device 120 obtains, such as receives from the radio communication device 110, information about radio conditions for use as input to the model.

Moreover, the base station device 120 may also obtain further information about e.g. Multiple Input Multiple Output (MIMO) antenna rank, Reference Signal Received Power (RSRP) to other radio network nodes, which can be used as input for prediction of the available throughput.

In more detail, the base station device 120 may collect radio statistics for all radio communication devices camping thereon. Features may be collected during a time period t_hist. t_hist indicates a time period during which data is collected before performing prediction. The data need to be buffered at the radio network node. Examples of features are:
Channel Quality Indicator (CQI) of each radio communication device Antenna rank of each UE
throughput for each radio communication device
Cells visited The base station device 120 also gathers its own internal information
Number of radio communication devices in the cell
Cell load.
Number of used frequency subbands
Number of active radio communication devices
Frequency of scheduling of each radio communication device The base station device 120 may finally gather information from neighboring cells using the X2 interface
Number of radio communication devices in the cell
Cell load.
Number of used frequency subbands
Number of active radio communication devices
For each radio communication device, the base station device 120 can generate additional information based on the information above.

For example, user mobility may be generated based on the visited cell history. Thus, predicting the cells visited by the radio communication device in the time period indicated by the indication.

For example, user traffic characterization may be generated using scheduling history for a communication device. Thus, estimating type of traffic generated by a radio communication device, e.g., small packets one at a time, short bursts, long bursts, full buffer, etc.

Moreover, the base station device 120 may also generate user statistics, such as:
Min UE throughput
Max UE throughput
Average UE throughput, and
Average number of active UEs.

Action A110

Here, it may be mentioned that the radio communication device 110 may transmit information about radio conditions to the base station device 120. Typically, this action is performed before action A100.

Now continuing with the actions performed by the base station device 120.

Action A120

The base station device 120 predicts the media stream rate based on the selected model and the information about radio conditions. The media stream rate may be referred, possibly somewhat more descriptive, to as a predicted average throughput. It shall be said that the predicted average throughput may of course be calculated from a set of instantaneous values representing throughput variation over e.g. a segment time period.

Action A130

The base station device 120 may associate each media rate of the second set with a respective probability relating to that said each media rate is transmittable over the radio communication network 100 without buffer under-run at the radio communication device 110. The base station device 120 may predict that no buffer under-run may occur based on certain assumptions about e.g. a size of the buffer at the radio communication device 110, a media rate at which the media stream is output by the radio communication device 110 and so on. Here, the media rate may refer to one of the media rates of the second set of media rates as assigned in action A140 directly below.

Action A140

The base station device 120 assigns one or more of the first set of media rates to the second set of media rates based on the predicted media stream rate.

One way of performing the assignment in this action is to select the most appropriate media rate(s) using machine learning classification methods. Each classification method may have an associated model as trained and created in action A010.

While recalling FIG. 2, the base station device 120 may for each bitrate of the first set of bitrates, each segment comprised in the time period indicated by the indication, an each predicted average throughput for each segment, classify the bitrate of the first set as suitable or non-suitable, e.g. one or zero, depending on relation between predicted average throughput and bitrate. For example, if predicted average throughput is above a throughput required for streaming of one of the bitrates of the first set, then that bitrate may be classified as suitable, i.e. assigned a value of one. Similarly, if predicted average throughput is below the throughput required for streaming of said one of the bitrates, then that bitrate may be classified as non-suitable, i.e. assigned a value of zero.

The model used for the classification may be chosen based on the bitrate to be classified, the time period indicated by the indication and the segment time periods. E.g. the radio conditions and the like may be used as input to the model when performing the classification. When performing this classification, it is desired that a model exists for the time period indicated by the indication, the segment time periods and the bitrates of the first set. Otherwise, a close enough model may be used, but this may decrease accuracy of the classification.

Action A150

The base station device 120 transmits, to the radio communication device 110, a response indicating the second set of media rates.

Action A160

The radio communication device 110 receives, from the base station device 120, a response indicating the second set of media rates.

Each media rate of the second set may be associated to a respective probability relating to that said each media rate is transmittable over the radio communication network 100 without buffer under-run at the radio communication device 110. The selecting A170 of the media rate may be based on the respective probability.

Action A170

The radio communication device 110 selects a media rate out of the second set of media rates.

The selecting A170 of the media rate may be based on buffer status and/or user preference.

Selection based on buffer status may mean that the selected media rate may be a lowest one of the second set of media rates when the buffer status indicates that the buffer is almost empty.

Selection based on user preference may mean that the selected media rate may be a highest one of the second set of media rates when the user preference indicates that highest possible resolution is desired. This may e.g. be applicable for users who have subscriptions with unlimited data plans. In other cases, e.g. applicable for users who have severely limited data plans, it may be that the selected media rates may be a lowest one of the second set of media rates in order not to consume the limited data available through the severely limited data plan.

Action 180

The radio communication device 110 may transmit a request for the media stream to the media server 130. The request may indicate the segments to stream of the media stream and the bitrate at which to stream the segments.

Action A190

The media server 130 may receive a stream request from the radio communication device 110. The stream request may indicate to the media server 130 that the media server 130 shall stream the media stream, e.g. which segments thereof as given by a certain bitrate, to the radio communication device 130.

Action A200

Thus, e.g. subsequent to action A190, the media server 130 transmits the media stream to the radio communication device 110.

Action A210

The radio communication device 110 may receive the media stream, i.e. the requested segments thereof.

According to the embodiments herein, selection of a media rate is performed by the radio communication device 110. However, standards relating to signalling e.g. between the radio network node 120 and the media server 130 and/or the radio communication device 110 and the media server 130 may evolve. It may then be possible that the second set of media rates are sent from the radio network node 110 to the media server 130, which thus receives a recommendation from the radio network node 120 and makes the selection of the media rate out of the second set of media rates. Additionally, it may then be possible that the second set of media rates are sent from the radio communication device 110 to the media server 130, which thus—as mentioned—receives the recommendation and makes the selection of the media rate out of the second set of media rates.

Figure 4:
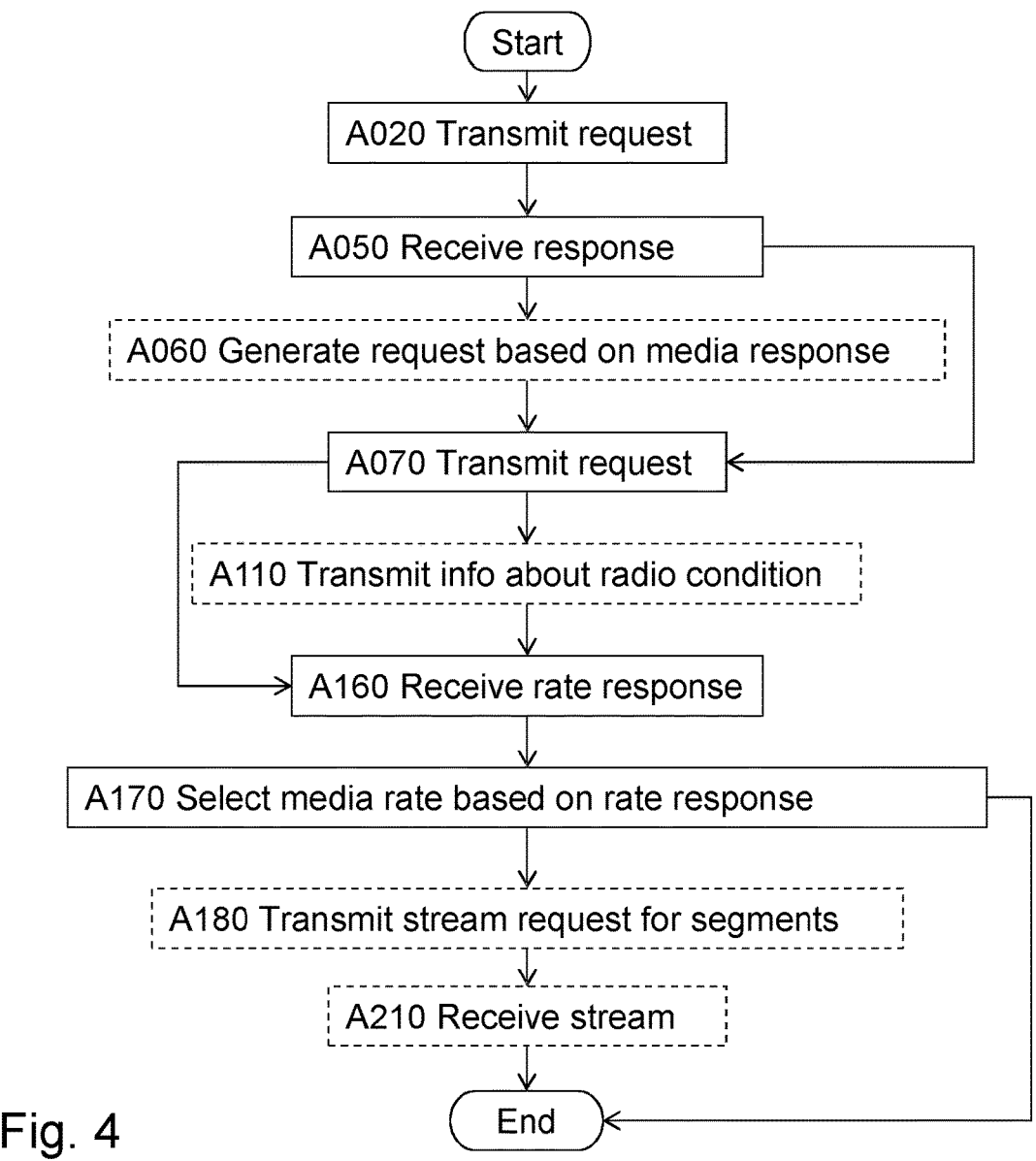
FIG. 4 is a flowchart illustrating embodiments of the method in the radio communication device.

In FIG. 4, a schematic flowchart of exemplifying methods in the radio communication device 110 is shown. Again, the same reference numerals as above have been used to denote the same or similar features, in particular the same reference numerals have been used to denote the same or similar actions. Accordingly, the radio communication device 110 performs a method for managing a media stream to be received from a media server 130.

As mentioned, the media stream comprises a plurality of segments, which are defined by a first set of media rates and by at least one segment time period relating to a duration of the plurality of segments.

One or more of the following actions may be performed in any suitable order.

Action A020

The radio communication device 110 transmits, to the media server 130, a request for the first set of media rates and the at least one segment time period.

Action A050

The radio communication device 110 receives, from the media server 130, a response indicating the first set of media rates and the at least one segment time period.

Action A060

The radio communication device 110 generates a request for a second set of media rates.

Action A070

The radio communication device 110 transmits, to a base station device 120, a request for a second set of media rates. The request comprises:

information about the first set of media rates, a parameter relating to length of the at least one segment time period, and an indication relating to a time period during which the second set of media rates is below a media stream rate for reception at the radio communication device 110.

thereby enabling the base station device 120 to predict the media stream rate, based on the indication and the parameter, and to assign one or more of the first set of media rates to the second set of media rates based on the media stream rate;

Action A110

The radio communication device 110 may transmit information about radio conditions to the base station device 120.

Action A160

The radio communication device 110 receives, from the base station device 120, a response indicating the second set of media rates.

Each media rate of the second set may be associated to a respective probability relating to that said each media rate is transmittable over the radio communication network 100 without buffer under-run at the radio communication device 110. The selecting A170 of the media rate may be based on the respective probability.

Action A170

The radio communication device 110 selects a media rate out of the second set of media rates.

The selecting A170 of the media rate may be based on buffer status and/or user preference.

Action A180

The radio communication device 110 may transmit a request for the media stream.

Action A210

The radio communication device 110 may receive the media stream.

Figure 5:
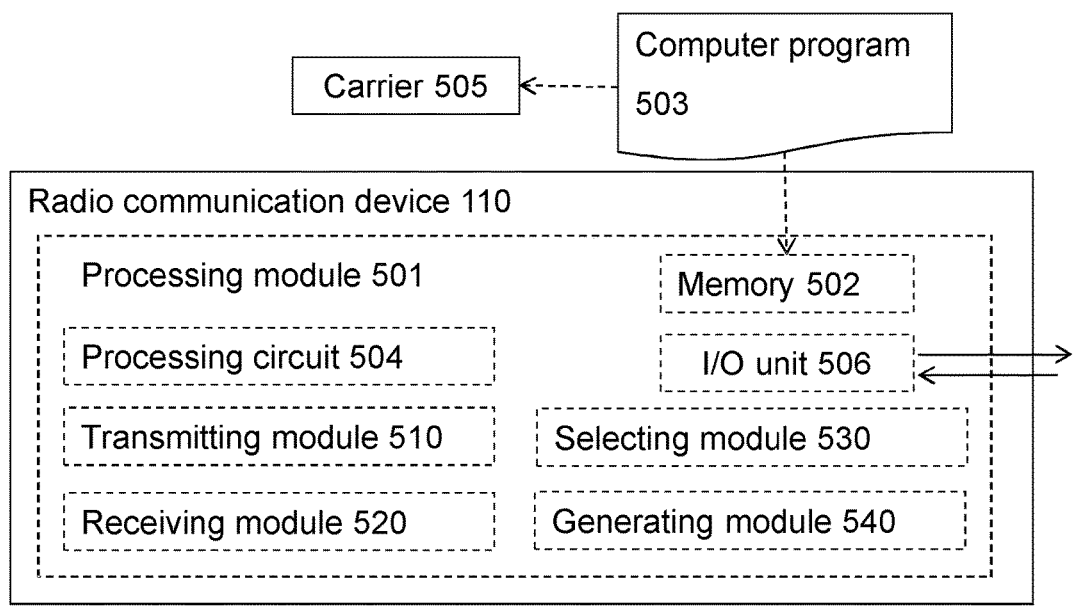
FIG. 5 is a block diagram illustrating embodiments of the radio communication device.

With reference to FIG. 5, a schematic block diagram of embodiments of the radio communication device 110 of FIG. 1 is shown.

The radio communication device 110 may comprise a processing module 501, such as a means, one or more hardware modules and/or one or more software modules for performing the methods described herein.

The radio communication device 110 may further comprise a memory 502. The memory may comprise, such as contain or store, a computer program 503.

According to some embodiments herein, the processing module 501 comprises, e.g. 'is embodied in the form of' or 'realized by', a processing circuit 504 as an exemplifying hardware module. In these embodiments, the memory 502 may comprise the computer program 503, comprising computer readable code units executable by the processing circuit 504, whereby the radio communication device 110 is operative to perform the methods of FIG. 3 and/or FIG. 4.

In some other embodiments, the computer readable code units may cause the radio communication device 110 to perform the method according to FIGS. 3 and/or 4 when the computer readable code units are executed by the radio communication device 110.

FIG. 5 further illustrates a carrier 505, or program carrier, which comprises the computer program 503 as described directly above.

In some embodiments, the processing module 501 comprises an Input/Output unit 506, which may be exemplified by a receiving module and/or a transmitting module as described below when applicable.

In further embodiments, the processing module 501 may comprise one or more of a transmitting module 510, a receiving module 520, a selecting module 530, and a generating module 540, as exemplifying hardware modules. In other examples, one or more of the aforementioned exemplifying hardware modules may be implemented as one or more software modules.

Accordingly, the radio communication device 110 is configured for managing a media stream to be received from a media server 130, wherein the media stream comprises a plurality of segments, which are defined by a first set of media rates and by at least one segment time period relating to a duration of the plurality of segments.

Therefore, according to the various embodiments described above, the radio communication device 110, the processing module 501 and/or the transmitting module 510 is configured for transmitting, to the media server 130, a request for the first set of media rates and the at least one segment time period.

The radio communication device 110, the processing module 501 and/or the receiving module 520 is configured for receiving, from the media server 130, a response indicating the first set of media rates and the at least one segment time period.

Moreover, the radio communication device 110, the processing module 501 and/or the transmitting module 510 is configured for transmitting, to a base station device 120, a request for a second set of media rates, wherein the request comprises:

information about the first set of media rates, a parameter relating to length of the at least one segment time period, and an indication relating to a time period during which the second set of media rates is below a media stream rate for reception at the radio communication device 110, thereby enabling the base station device 120 to predict the media stream rate, based on the indication and the parameter, and to assign one or more of the first set of media rates to the second set of media rates based on the media stream rate.

Furthermore, the radio communication device 110, the processing module 501 and/or the receiving module 520 is configured for receiving, from the base station device 120, a response indicating the second set of media rates.

Additionally, the radio communication device 110, the processing module 501 and/or the selecting module 530 is configured for selecting a media rate out of the second set of media rates.

The radio communication device 110, the processing module 501 and/or the selecting module 530 may be configured for selecting the media rate based on buffer status and/or user preference.

As mentioned, in some embodiments, each media rate of the second set may be associated to a respective probability relating to that said each media rate is transmittable over the radio communication network 100 without buffer under-run at the radio communication device 110. In these embodiments, the radio communication device 110, the processing module 501 and/or the selecting module 530 may be configured for selecting the media rate is based on the respective probability.

The radio communication device 110, the processing module 501 and/or the transmitting module 510 may be configured for transmitting information about radio conditions.

The radio communication device 110, the processing module 501 and/or the generating module 540 may be configured for generating a request for a second set of media rates.

Figure 6:
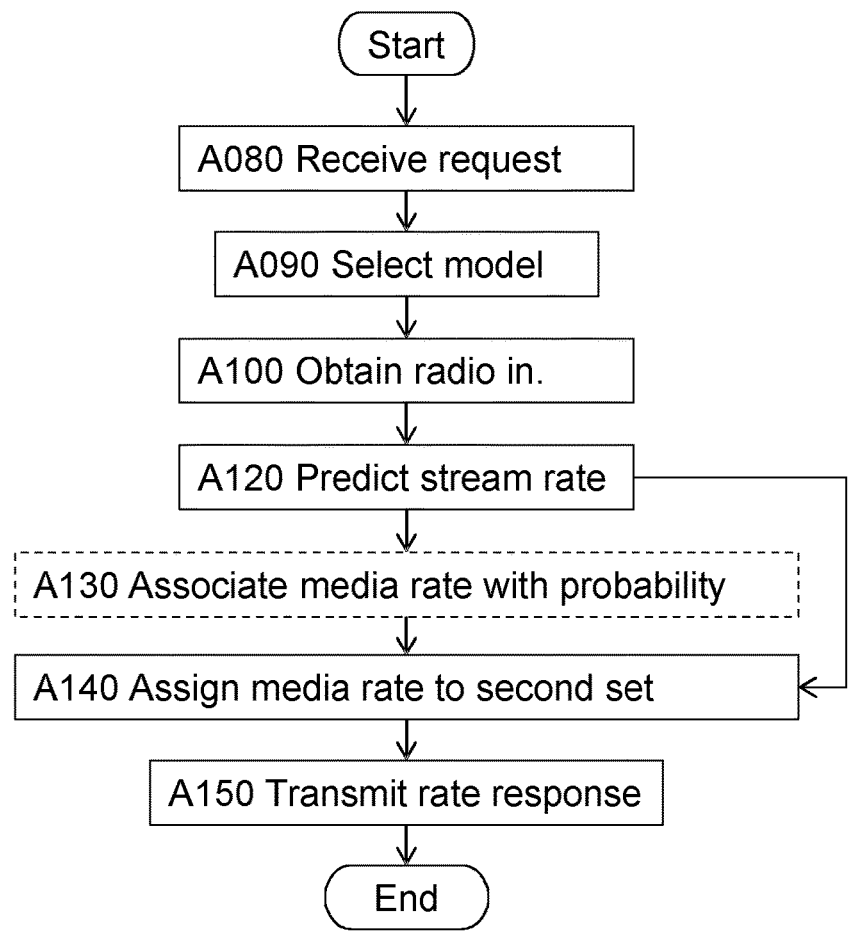
FIG. 6 is a flowchart illustrating embodiments of the method in the base station device.

In FIG. 6, a schematic flowchart of exemplifying methods in the base station device 120 is shown. Again, the same reference numerals as above have been used to denote the same or similar features, in particular the same reference numerals have been used to denote the same or similar actions. Accordingly, the base station device 120 performs a method for managing a media stream to be transmitted from a media server 130 to a radio communication device 110.

As mentioned, the media stream comprises a plurality of segments, which are defined by a first set of media rates and by one or more segment time periods relating to a duration of the plurality of segments.

One or more of the following actions may be performed in any suitable order.

Action A010

The base station device 120 may train a set of models, wherein the set of models comprises the model for prediction of the stream rate.

Action A080

The base station device 120 receives, from the radio communication device 110, a request for a second set of media rates, wherein the request comprises:

information about the first set of media rates, a parameter relating to length of the one or more segment time periods, and an indication relating to a time period during which the second set of media rates is below a media stream rate for reception at the radio communication device 110.

Action A090

The base station device 120 selects a model for prediction of the media stream rate based on the indication and the parameter.

Action A100

The base station device 120 obtains information about radio conditions for use as input to the model.

Action A120

The base station device 120 predicts the media stream rate based on the selected model and the information about radio conditions.

Action A130

The base station device 120 may associate each media rate of the second set with a respective probability relating to that said each media rate is transmittable over the radio communication network 100 without buffer under-run at the radio communication device 110.

Action A140

The base station device 120 assigns one or more of the first set of media rates to the second set of media rates based on the predicted media stream rate.

Action A150

The base station device 120 transmits, to the radio communication device 110, a response indicating the second set of media rates.

Figure 7:
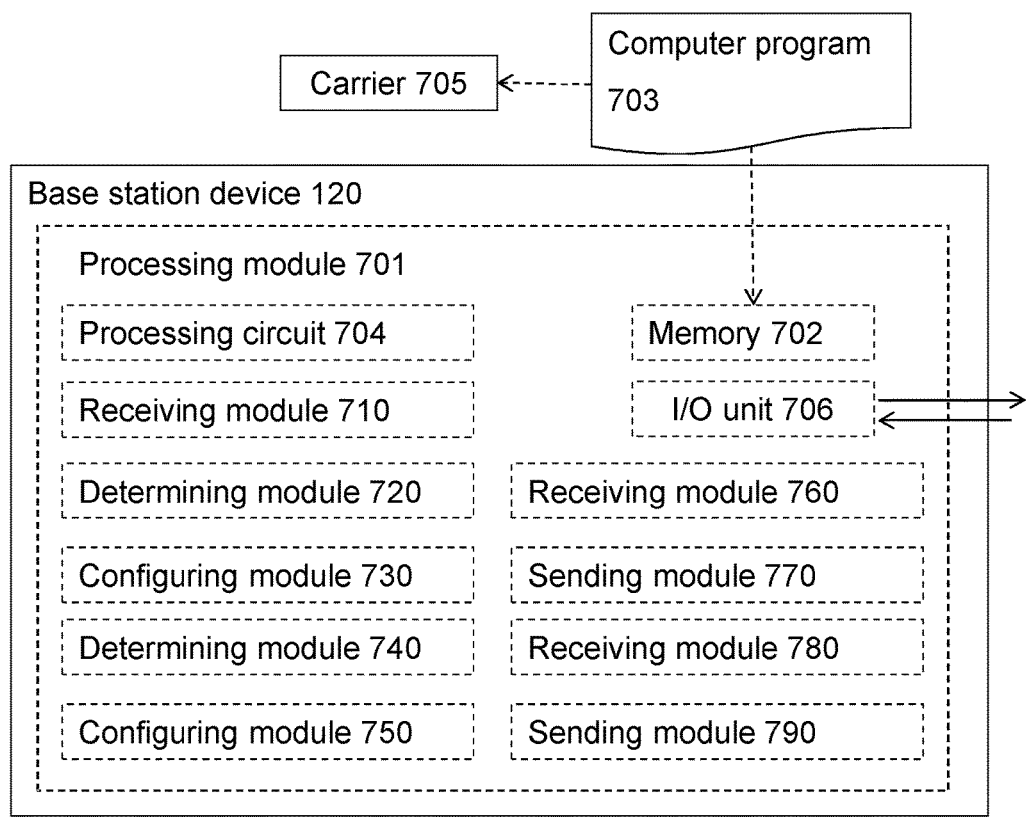
FIG. 7 is a block diagram illustrating embodiments of the base station device.

With reference to FIG. 7, a schematic block diagram of embodiments of the base station device 120 of FIG. 1 is shown.

The base station device 120 may comprise a processing module 701, such as a means, one or more hardware modules and/or one or more software modules for performing the methods described herein.

The base station device 120 may further comprise a memory 702. The memory may comprise, such as contain or store, a computer program 703.

According to some embodiments herein, the processing module 701 comprises, e.g. 'is embodied in the form of' or 'realized by', a processing circuit 704 as an exemplifying hardware module. In these embodiments, the memory 702 may comprise the computer program 703, comprising computer readable code units executable by the processing circuit 704, whereby the base station device 120 is operative to perform the methods of FIG. 3 and/or FIG. 6.

In some other embodiments, the computer readable code units may cause the base station device 120 to perform the method according to FIGS. 3 and/or 6 when the computer readable code units are executed by the base station device 120.

FIG. 7 further illustrates a carrier 705, or program carrier, which comprises the computer program 703 as described directly above.

In some embodiments, the processing module 701 comprises an Input/Output unit 706, which may be exemplified by a receiving module and/or a transmitting module as described below when applicable.

In further embodiments, the processing module 701 may comprise one or more of a receiving module 710, a selecting module 720, an obtaining module 730, a predicting module 740, an assigning module 750, a transmitting module 760, an associating module 770, and a training module 780, as exemplifying hardware modules. In other examples, one or more of the aforementioned exemplifying hardware modules may be implemented as one or more software modules.

Accordingly, the base station device 120 is configured for managing a media stream to be transmitted from a media server 130 to a radio communication device 110.

As mentioned, the media stream comprises a plurality of segments, which are defined by a first set of media rates and by one or more segment time periods relating to a duration of the plurality of segments.

Therefore, according to the various embodiments described above, the base station device 120, the processing module 701 and/or the receiving module 710 is configured for receiving, from the radio communication device 110, a request for a second set of media rates, wherein the request comprises:

information about the first set of media rates, a parameter relating to length of the one or more segment time periods, and an indication relating to a time period during which the second set of media rates is below a media stream rate for reception at the radio communication device 110.

The base station device 120, the processing module 701 and/or the selecting module 720 is configured for selecting a model for prediction of the media stream rate based on the indication and the parameter.

Moreover, the base station device 120, the processing module 701 and/or the obtaining module 730 is configured for obtaining information about radio conditions for use as input to the model. The base station device 120, the processing module 701 and/or the predicting module 740 is configured for predicting the media stream rate based on the selected model and the information about radio conditions.

Furthermore, the base station device 120, the processing module 701 and/or the assigning module 750 is configured for assigning one or more of the first set of media rates to the second set of media rates based on the predicted media stream rate.

Additionally, the base station device 120, the processing module 701 and/or the transmitting module 760 is configured for transmitting, to the radio communication device 110, a response indicating the second set of media rates.

The base station device 120, the processing module 701 and/or the associating module 770 may be configured for associating each media rate of the second set with a respective probability relating to that said each media rate is transmittable over the radio communication network 100 without buffer under-run at the radio communication device 110.

The base station device 120, the processing module 701 and/or the training module 780 is configured for training a set of models, wherein the set of models comprises the model for prediction of the stream rate.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio communication device, for managing a media stream to be received from a media server, wherein the method comprises:
    transmitting, to the media server, a request for a first set of media rates and at least one segment time period of a media stream comprising a plurality of segments which are defined by the first set of media rates and by the at least one segment time period, the at least one segment time period relating to a duration of the plurality of segments;
    receiving, from the media server, a response indicating the first set of media rates and the at least one segment time period;
    transmitting, to a base station device, a request for a second set of media rates, wherein the request comprises:
        information about the first set of media rates,
        a parameter relating to length of the at least one segment time period, and
        an indication relating to a time period during which the second set of media rates is below a media stream rate for reception at the radio communication device,
        thereby enabling the base station device to predict the media stream rate, based on the indication and the parameter, and to assign one or more of the first set of media rates to the second set of media rates based on the media stream rate;
    receiving, from the base station device, a response indicating the second set of media rates, and
    selecting a media rate out of the second set of media rates.

2. The method according to claim 1, wherein the selecting of the media rate is based on buffer status and/or user preference.

3. The method according to claim 1, wherein each media rate of the second set is associated to a respective probability relating to that said each media rate is transmittable over the radio communication network without buffer under-run at the radio communication device, wherein the selecting of the media rate is based on the respective probability.

4. The method according to claim 1, wherein the method further comprises:
    transmitting information about radio conditions to the base station device.

5. The method according to claim 4, wherein the method comprises:
    associating each media rate of the second set with a respective probability relating to that said each media rate is transmittable over the radio communication network without buffer under-run at the radio communication device.

6. A computer program, comprising computer readable code units which when executed on a radio communication device causes the radio communication device to perform the method according to claim 1.

7. The method according to claim 1 further comprising: transmitting, to the media server, the selected media rate with an identification of the media stream.

8. A method, performed by a base station device, to manage a media stream to be transmitted from a media server to a radio communication device, wherein the method comprises:
    receiving, from the radio communication device, a request for a second set of media rates of a media stream that comprises a plurality of segments, which are defined by a first set of media rates and by one or more segment time periods relating to a duration of the plurality of segments, wherein the request comprises:
        information about the first set of media rates,
        a parameter relating to length of the one or more segment time periods, and
        an indication relating to a time period during which the second set of media rates is below a media stream rate for reception at the radio communication device,
    selecting a model for prediction of the media stream rate based on the indication and the parameter;
    obtaining information about radio conditions for use as input to the model;
    predicting the media stream rate based on the selected model and the information about radio conditions;
    assigning one or more of the first set of media rates to the second set of media rates based on the predicted media stream rate; and
    transmitting, to the radio communication device, a response indicating the second set of media rates.

9. The method according to claim 8, wherein the method comprises:
    training a set of models, wherein the set of models comprises the model for prediction of the stream rate.

10. A computer program, comprising computer readable code units which when executed on a base station device causes the base station device to perform the method according to claim 8.

11. A radio communication device configured to manage a media stream to be received from a media server, wherein the radio communication device is configured to:
    transmit, to the media server, a request for a first set of media rates and at least one segment time period of a media stream comprising a plurality of segments which are defined by the first set of media rates and by the at least one segment time period, the at least one segment time period relating to a duration of the plurality of segments;
    receive, from the media server, a response indicating the first set of media rates and the at least one segment time period;
    transmit, to a base station device, a request for a second set of media rates, wherein the request comprises:
        information about the first set of media rates,
        a parameter relating to length of the at least one segment time period, and
        an indication relating to a time period during which the second set of media rates is below a media stream rate for reception at the radio communication device,
        thereby enabling the base station device to predict the media stream rate, based on the indication and the parameter, and to assign one or more of the first set of media rates to the second set of media rates based on the media stream rate;
    receive, from the base station device, a response indicating the second set of media rates, and
    select a media rate out of the second set of media rates.

12. The radio communication device according to claim 11, wherein the radio communication device is configured to select the media rate based on buffer status and/or user preference.

13. The radio communication device according to claim 11, wherein each media rate of the second set is associated to a respective probability relating to that said each media rate is transmittable over the radio communication network without buffer under-run at the radio communication device, wherein the radio communication device is configured to select the media rate is based on the respective probability.

14. The radio communication device according to claim 11, wherein the radio communication device is configured to transmit information about radio conditions.

15. The radio communication device according to claim 11, wherein the radio communication device is further configured to:
   transmit, to the media server, the selected media rate with an identification of the media stream.

16. A base station device configured to manage a media stream to be transmitted from a media server to a radio communication device, wherein the base station device is configured to:
   receive, from the radio communication device, a request for a second set of media rates of a media stream that comprises a plurality of segments, which are defined by a first set of media rates and by one or more segment time periods relating to a duration of the plurality of segments, wherein the request comprises:
   information about the first set of media rates,
   a parameter relating to length of the one or more segment time periods, and
   an indication relating to a time period during which the second set of media rates is below a media stream rate for reception at the radio communication device,
   select a model for prediction of the media stream rate based on the indication and the parameter;
   obtain information about radio conditions for use as input to the model;
   predict the media stream rate based on the selected model and the information about radio conditions;
   assign one or more of the first set of media rates to the second set of media rates based on the predicted media stream rate; and
   transmit, to the radio communication device, a response indicating the second set of media rates.

17. The base station device according to claim 16, wherein the base station device is configured to associate each media rate of the second set with a respective probability relating to that said each media rate is transmittable over the radio communication network without buffer under-run at the radio communication device.

18. The base station device according to claim 16, wherein the base station device is configured to train a set of models, wherein the set of models comprises the model for prediction of the stream rate.

* * * * *